United States Patent [19]

Shaffer

[11] 4,121,014
[45] Oct. 17, 1978

[54] HAZE-FREE TRANSPARENT LAMINATE HAVING A PLASTICIZED POLYVINYL ACETAL SHEET

[75] Inventor: Paul E. Shaffer, Pittsburgh, Pa.

[73] Assignee: PPG Industries, Inc., Pittsburgh, Pa.

[21] Appl. No.: 818,913

[22] Filed: Jul. 25, 1977

Related U.S. Application Data

[63] Continuation of Ser. No. 340,512, Mar. 12, 1973, abandoned.

[51] Int. Cl.$^2$ ............................................. B32B 27/36
[52] U.S. Cl. ................................. 428/412; 428/414; 428/415; 428/424; 428/409; 156/106; 156/306
[58] Field of Search ............... 428/412, 414, 415, 424, 428/409

[56] References Cited

U.S. PATENT DOCUMENTS

| | | | |
|---|---|---|---|
| 3,591,406 | 7/1971 | Moynihan | 428/409 X |
| 3,671,370 | 6/1972 | Littell, Jr. | 428/38 |
| 3,841,955 | 10/1974 | Coaker et al. | 428/437 |
| 4,035,549 | 7/1977 | Kennar | 428/424 X |

OTHER PUBLICATIONS

Lexan, GE Tech. Report CDC-502, pp. 3-11.

Primary Examiner—P. C. Ives
Attorney, Agent, or Firm—Edward I. Mates

[57] ABSTRACT

A method for overcoming laminate failure in laminated windows containing adjacent layers of polycarbonate and plasticized polyvinyl acetal is disclosed. The method involves applying a protective adhesive means such as a film of a polyurethane or an epoxy resin to a major surface of at least one of the sheets, assembling the sheets with said film on an interfacial surface of the assembly, and laminating the assembly at high temperature and pressure. Also disclosed are various laminate configurations containing a plasticized polyvinyl acetal-polycarbonate interfacial surface treated according to the present invention. Such laminates are useful as substantially haze-free, transparent articles, such as windows for aircraft.

7 Claims, 4 Drawing Figures

HAZE-FREE TRANSPARENT LAMINATE HAVING A PLASTICIZED POLYVINYL ACETAL SHEET

This application is a continuation of application Ser. No. 340,512, filed Mar. 12, 1973, now abandoned.

BACKGROUND OF THE INVENTION

1. Field of the Invention

This invention relates to laminated window assemblies, particularly of the type used in aircraft. More particularly, this invention relates to a method for overcoming laminate failure in polycarbonate-polyvinyl acetal laminated windows.

2. Brief Description of the Prior Art

It is well known in the art to make laminated windows with glass and rigid polycarbonate sheeting. Polycarbonate is optically clear, has a refractive index approximating that of glass and has excellent impact and load-bearing properties. However, polycarbonate does not laminate well to glass. The rigid polycarbonate sheet and the glass have such different coefficients of thermal expansion that a laminate prepared from the two will crack on cooling from the high temperatures needed for lamination. When lower laminating temperatures are used, the bond strength between the glass and the polycarbonate is insufficient for commercial applications.

It has been proposed in the art that the glass can be bonded to polycarbonate indirectly through the use of a thermoplastic interlayer material which could absorb the stresses of high temperature and pressure lamination and yet still provide strong bonding for the glass and for the polycarbonate. Thus, Saunders in U.S. Pat. No. 3,388,032 and Moynihan in U.S. Pat. No. 3,458,388 disclose the use of polyurethane interlayers to bond polycarbonate to glass.

McCombie in U.S. Pat. No. 3,388,034 discloses the use of polyvinyl butyral sheeting as an interlayer material for bonding glass to polycarbonate. For the polyvinyl butyral material to be an effective interlayer material, that is, in contributing good impact properties, it is necessary that it be plasticized. However, the conventional plasticizer for polyvinyl butyral, for example, triethylene glycol di-(2-ethyl butyrate), is unsatisfactory for use with polycarbonate. The polycarbonate develops a haze after a short period of time in contact with polyvinyl butyral so plasticized, making the resultant window unsightly looking and unsatisfactory for aircraft use. Further, the laminate bond strength between the polycarbonate and the polyvinyl butyral is not as strong as desired and as a result, the laminate containing polyvinyl butyral bonded to polycarbonate does not have optimum impact and load-bearing properties.

Buckley in U.S. Pat. No. 3,388,033 recognized this problem with conventionally plasticized polyvinyl butyral and suggested a specially plasticized polyvinyl butyral, that is, one plasticized with a phosphate plasticizer such as tricresyl phosphate. Although the special plasticizer prevents hazing, the bond strength developed between plasticized polyvinyl acetal and polycarbonate under normal laminating conditions is at the most only about 5 pounds per lineal inch. This low degree of bonding is inadequate and can result in delamination, which may have serious consequences. For example, delamination between the two plies may cause an opaqueness in the window which obscures vision. Also, delamination reduces the impact and load-bearing properties of the window, making it more susceptible to failure from bird or projectile impacts.

It would therefore be desirable to overcome the source of failure in laminated windows containing adjacent plies of plasticized polyvinyl acetal and polycarbonate. It would be desirable to provide multi-layer laminated articles containing adjacent plies of polycarbonate and polyvinyl acetal which could be used as transparent windows for such applications as military and commercial aircraft.

This invention provides such laminated articles and also provides a method for overcoming the source of failure in such laminates.

SUMMARY OF THE INVENTION

This invention provides a method for improving the adhesion between polyvinyl acetal and polycarbonate sheeting. The method involves applying a thin film of polyurethane or epoxy to an interfacial surface between the sheets prior to assembling them for lamination. Thus, a laminated article is provided comprising a sheet of polycarbonate bonded to a polyvinyl acetal sheet through a film of a protective adhesive such as a polyurethane or epoxy resin. The polyurethane or epoxy film provides greater bond strength between the polycarbonate and the polyvinyl acetal and also prevents hazing of the polycarbonate due to the reaction of the plasticizer in the polyvinyl acetal sheeting with the polycarbonate.

DETAILED DESCRIPTION

Figure 1:
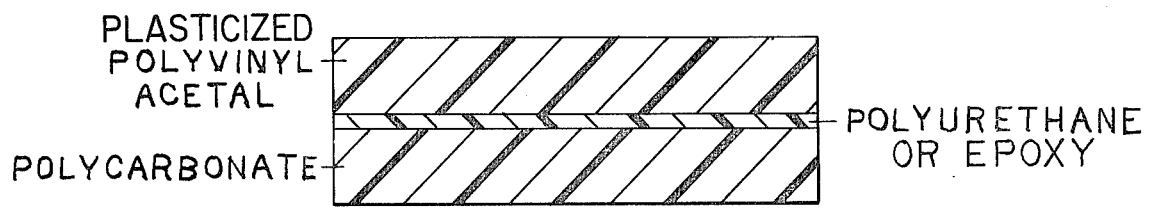
FIGS. 1 to 4 show various laminate configurations of the invention employing a thin polyurethane or epoxy film as an adhesive layer between the polyvinyl acetal and the polycarbonate layers.

Referring to the drawings, FIG. 1 shows the basic laminate construction of the invention, a rigid polycarbonate sheet bonded to a polyvinyl acetal sheet through a thin polyurethane film.

The basic laminate shown in FIG. 1 is generally used in prelaminate form. That is, it is usually laminated to another member through the exposed layer of the polyvinyl acetal which is sensitive to moisture and cannot readily be exposed to the atmosphere. Some examples of laminate configuration employing the prelaminate of FIG. 1 are shown in FIGS. 2 to 4.

Figure 2:
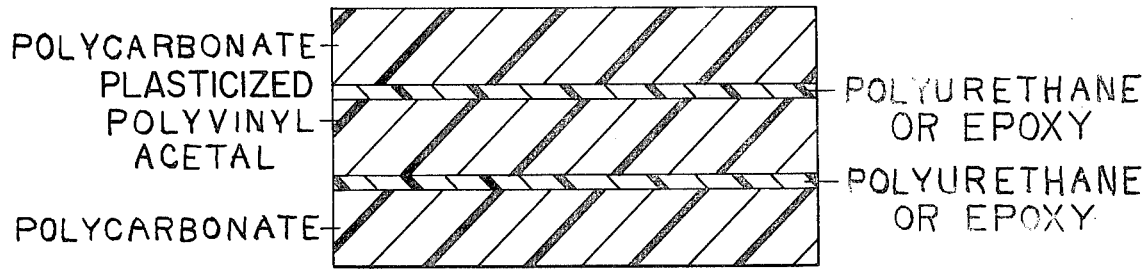

FIG. 2 is a laminate configuration comprising a sheet of polyvinyl acetal sandwiched between two sheets of polycarbonate or acrylic clad polycarbonate which are bonded to the polyvinyl acetal core with a thin polyurethane or epoxy film. Such a laminate would find utility in a window for a low flying aircraft such as a helicopter.

Figure 3:
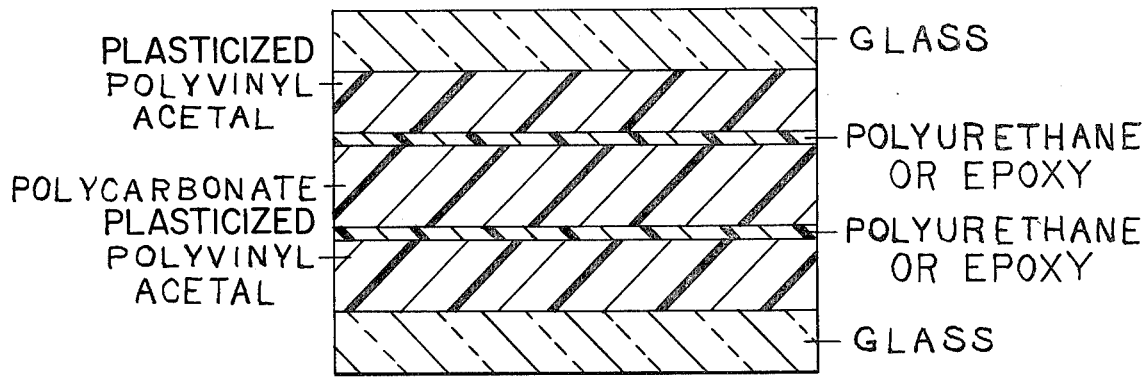

FIG. 3 depicts a multi-layer laminated article comprising a sheet of polycarbonate sandwiched between sheets of polyvinyl acetal which in turn are sandwiched between sheets of glass which may be annealed, or chemically or thermally tempered. Optionally, the outer glass plies may be replaced with polycarbonate or acrylic clad polycarbonate. The sheets of polycarbonate are bonded to the polyvinyl acetal sheets through a thin polyurethane or epoxy film. Laminates such as shown in FIG. 3 find utility in high speed, high flying commercial aircraft which are pressurized and are called upon to withstand bird impacts of 600 miles per hour or greater.

Figure 4:
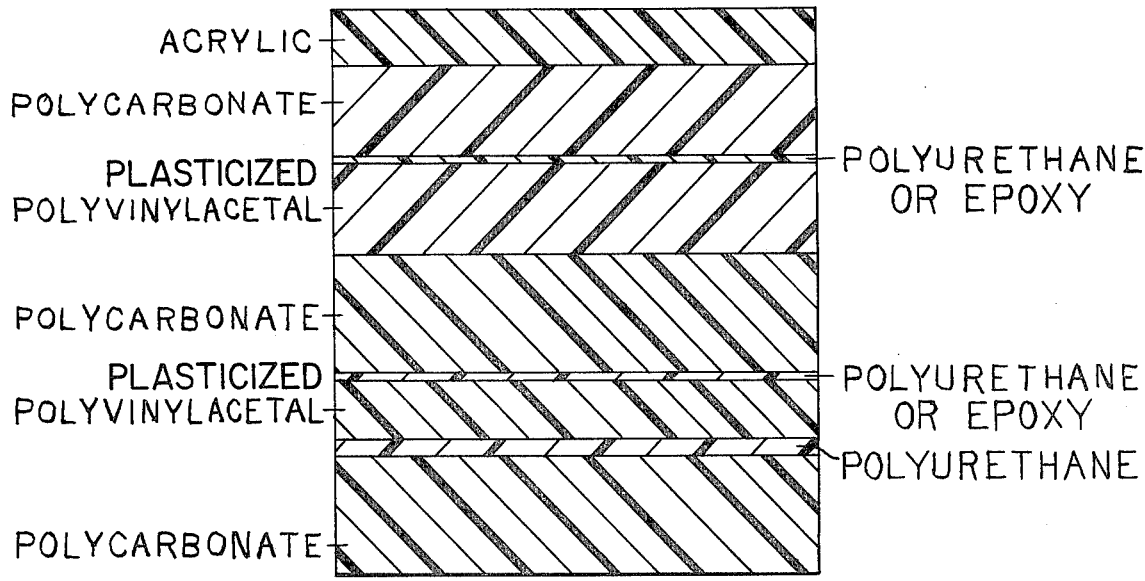

FIG. 4 shows a laminate construction comprising a core layer of polycarbonate sandwiched between and adhesively bonded with an epoxy or polyurethane film to two layers of polyvinyl acetal, one of which is thicker than the other. The polyvinyl acetal layers are in turn each adhesively bonded with a thin polyurethane or epoxy film to two outer sheets of polyvinyl acetal which in turn are adhesively bonded through a polyurethane or epoxy film to two outer sheets of polycarbonate which in turn may be fusion bonded to an exposed acrylic surface sheet. Laminates such as those shown in FIG. 4 are used in bullet-proof canopies of high speed and high altitude military fighter aircraft. In such configurations, usually the outboard surface is acrylic clad for abrasion resistance, while the inboard surface is polycarbonate.

The thickness of the individual plies of the various laminate structures of the invention will vary depending on the end use to which the laminates are put. In general, in aircraft laminate configurations, such as shown in FIGS. 2 and 3, the polycarbonate sheet should have a thickness of between 250 to 750 mils, and the polyvinyl acetal sheeting should have a thickness of between 180 to 380 mils. In FIG. 3 where the outer plies of the laminate are glass, the glass should have a thickness of 180 to 500 mils. In laminate configurations such as FIG. 4, the laminate plies should be of the following thicknesses:

| Ply | Thickness in mils |
| --- | --- |
| Acrylic | 20 – 30 |
| Polycarbonate | 250 – 380 |
| Polyvinyl acetal | 250 – 380 |
| Polycarbonate | 250 – 750 |
| Polyvinyl acetal | 120 – 180 |
| Polycarbonate | 250 – 750 |

The thickness of the polyurethane or epoxy film will vary between about 0.01 to 50 mils and will depend on the method of application. Spraying produces very thin films on the order of 0.01 to 1 mil and brushing produces thicker films on the order of 2 to 5 mils. Extruded film or sheet varies from about 5 to 50 mils. It appears that thicker film thicknesses produce somewhat stronger bond strength.

The degree of adhesion between the polycarbonate and the polyvinyl acetal through the polyurethane or epoxy film should be at least 20, and preferably greater than 30 pounds per lineal inch to avoid laminate failure. The degree of adhesion is measured by the 90° Peel Test according to NASA Tech Brief 65-10173. As a point of comparison, the degree of adhesion without the polyurethane or epoxy film ranges from 0 to 5 pounds per lineal inch.

The polyurethane or epoxy film can be applied to the interfacial surface of the polyvinyl acetal and the polycarbonate in a number of ways. The polyurethanes are available in film or sheet form, and a sheet or film of the desired thickness can be sandwiched between the polycarbonate and polyvinyl acetal prior to lamination. Alternately, if the polyurethane or epoxy is available as a liquid, such as a solution of the polyurethane or epoxy, the solution may be brushed, dipped, sprayed or roll coated onto the interfacial surface of either the polycarbonate or polyvinyl acetal prior to lamination. Suitable solvents for polyurethanes and epoxies are organic solvents which are preferably non-aqueous and include tetrahydrofuran, methylethyl ketone, methylisobutyl ketone, cyclohexanol, N-methyl-2-pyrrolidone, dimethyl formamide and chloroform. The concentration of the polyurethane or epoxy in the solvent should be about 0.1 to 20 percent by weight based on total weight of the solution and the concentration used will depend principally on the ultimate thickness of the film desired, on the viscosity of the resultant solution, and how the film is to be applied, be it spraying, brushing or the like. For spraying, it is desirable to have a thinner solution, i.e. about 0.1 to 3 percent, so as not to clog the spray gun. Also, for spraying, the solutions should have a viscosity between 25 to 50 centipoises at 20° C. With other means of application, such as brushing or roll coating, thicker solutions, i.e. about 5 to 20 percent, can be used.

After the polyurethane or epoxy solution has been applied to the interfacial surface of the polycarbonate or the polyvinyl acetal, the solvent is evaporated usually at ambient conditions for about 1 to 5 hours, depending on the thickness of the coating and the volatility of the solvent. Slight heat and/or vacuum may be used to help evaporate the solvent as long as the optical clarity of the film is not affected.

After the thin polyurethane or epoxy film, be it in sheet form or deposited from solution, has been applied to the interfacial surface of the polycarbonate and the polyvinyl acetal sheeting, the sheets are assembled for lamination. For lamination, the sheets are sandwiched between two rigid pressing plies such as glass sheets which may or may not become part of the final laminate structure. The assembled laminate is then subjected to heat and pressure sufficient to permanently adhere one layer to another.

Laminating is usually conducted in an oil autoclave or other suitable high pressure equipment where the laminate is heated to a temperature of about 250° F. to 375° F. and at a pressure of between 50 to 500 pounds per square inch for about 30 to 180 minutes to laminate the sandwich. The temperature of the oil is then reduced to about 150° F., the pressure is released and the sandwich sample removed from the autoclave, cleaned and made ready for use or shipment.

Since the above-described laminates find use as aircraft windows, it is important that they have optically smooth surfaces, that is, that there be no abrupt changes of thickness in the surface which would produce double vision or a lens effect.

To meet this requirement, it is desirable that the pressing plies be glass which possesses the necessary optical smoothness. It is preferable to have the glass pressing plies in the resultant laminate configuration such as is shown in FIG. 3. In this case the glass should be laminated to the polyvinyl acetal sheet rather than the polycarbonate sheet because a direct glass-polycarbonate laminate bond will crack either the glass or the polycarbonate on cooling down after autoclaving.

In cases where it is desirable to omit the glass pressing ply from the final laminate configuration, the interior surface of the glass, i.e., the surface in contact with the plastic, should be coated with a release material which will permit the glass pressing plate to release from the plastic at the completion of lamination. Suitable release agents include polytetrafluoroethylene films sold commercially under the trademark TEFLON.

Laminates prepared according to the invention are transparent and substantially free of haze even when conventionally plasticized polyvinyl butyral is used. Accordingly, laminates of the invention are transparent having visible light transmissions of greater than 70 percent and haze values of less than 5.0 percent as measured by Gardner Transmittance and Haze Meter. In comparison, laminates prepared with conventionally plasticized polyvinyl butyral laminated directly to polycarbonate without a protective adhesive have haze values on the order of 50 percent.

The polyurethanes used for the thin film can broadly be described as the reaction product of a polyisocyanate and a polyol which upon lamination, as described, forms a transparent film. The polyurethane can have thermoplastic or thermosetting properties. Thus, for example, an organic diisocyanate is reacted with a relatively long chain diol and a curing agent which is usually a monomeric compound having at least two active hydrogens per molecule, as determined by the Zerewitinoff test described in Kohler, *J. Am. Chem. Soc.*, 49, 3181 (1927). Suitable polyisocyanates are organic diisocyanates which include aromatic, aliphatic, cycloaliphatic and heterocyclic diisocyanates. Examples are 2,4- and 2,6-toluylene diisocyanate, 1,4-butane diisocyanate, 1,2-isocyanato-methyl cyclobutane, 4,4'-methylene-bis-(cyclohexyl isocyanate), 1,10-decane diisocyanate, and furfurylidene diisocyanate.

Suitable long chain diols include polyester diols and polyether diols. The polyester diols can be prepared by the polyesterification reaction of an aliphatic dibasic acid or an anhydride thereof with a diol, preferably an aliphatic diol. Suitable aliphatic dicarboxylic acids can be represented by the formula HOOC—R—COOH wherein R is an alkylene radical containing from 2 to 12, and preferably 4 to 8, carbon atoms inclusive, examples of which are adipic, succinic, palmitic, suberic, azelaic and sebacic moieties. Suitable aliphatic diols contain from 2 to 15 carbon atoms, exemplary of which are ethylene glycol, 1,3-propanediol, 1,4-butanediol and 1,6-hexanediol. The average molecular weight of the polyester diol should be between 750 and 5000, preferably between 1000 and 3300.

Representative of the polyether diols are the poly(oxypolymethylene) glycol which include those of the formula:

where $n$ is from 3 to 6 and $m$ can be varied considerably, e.g. from 2 to 30 or higher, preferably being between about 6 and about 20. Included are poly(oxytetramethylene) glycols, which are preferred, and poly(oxytrimethylene) glycols, which are also advantageously utilized, as well as poly(oxypentamethylene) glycols, and poly(oxyhexamethylene) glycols. Other poly(oxypolymethylene) glycols not within the above formula are also usable but are less desirable as a class; these include, for example, branched carbon chain compounds. The poly(oxypolymethylene) glycol should have a molecular weight between about 400 and about 3500.

With the thermoplastic polyurethanes the polyisocyanate and the long chain glycol are preferably reacted with a curing agent which has two active hydrogens per molecule. Preferred curing agents are aliphatic diols having from 2 to 15 carbon atoms such as ethylene glycol, 1,3-propanediol, 1,4-butanediol and 1,6-hexanediol. Aminoalcohols and diamines can also be employed. Examples include monoethanolamine and 1,2-ethanediamine.

For a polyurethane with thermosetting properties to be prepared, it is necessary that the curing agent contain at least three active hydrogens. Representative of such compounds are polyols having at least three hydroxyl groups; such as trimethylolpropane, trimethylolheptane, pentaerythritol and castor oil. Also suitable are mixed curing agents such as polyols having three hydroxyl groups in conjunction with a low molecular weight diol such as ethylene glycol and 1,4-butanediol. The polyols can also be mixed with polyamines having 2, 3, 4, 5, 6 or more reactive amine groups. Suitable polyamines are aromatic amines such as 4,4'-methylene-bis(2-chloroaniline) and diamino diphenyl sulfone.

The thermoplastic polyurethanes can be prepared by pre-reacting the organic diisocyanate (about 4 molar parts) with the mixture of diols (about 1 molar part long chain diol and 2.8 molar parts curing agent) for about 15 minutes at a temperature of from about 100° to about 120° C. and then cooling the reaction mixture to a temperature below about 30° C. in order to interrupt the reaction and produce a thermoplastic product which has free isocyanate groups. The plastic can then be extruded into film or thicker sheet form and thinner films of the required thickness skived from the sheets. Alternately, the sheet may be cut into sections and dissolved with high shear in suitable solvents such as the ones described above and applied to the interfacial surface of the polycarbonate and polyvinyl acetal in this fashion. Thermoplastic types of polyurethanes are described in U.S. Patent Application Ser. No. 242,347, filed Apr. 10, 1972, by N. V. Seeger and A. J. Kaman.

The thermosetting polyurethanes are preferably prepared by the so-called prepoylmer method in which the polyisocyanate is partially reacted with the long chain diol to form an isocyanato-terminated adduct which is then cured with suitable curing agents to produce a thermosetting product which has free isocyanate groups.

The thermosetting polyurethane is ordinarily prepared by first heating a prepolymer of the long chain diol and the polyisocyanate themselves under a vacuum for about 1 to 2 hours. The prepolymer is then mixed with the curing agent in a suitable vessel. The prepolymer method could also be used in the preparation of the thermoplastic polyurethanes in which the polyisocyanate would be first reacted with the long chain diol and then cured with the low molecular weight short chain compound having two active hydrogen compounds.

Since the thermosetting polyurethane cannot readily be extruded into film or sheet form, another method of preparing the polymers must be used. The thermosetting polyurethane can be centrifugally cast into sheet and film form in a rotating drum by rotational casting techniques well known in the art. Also, the uncured reaction mixture could be poured between two smooth planar spaced plates having interior release surface and cured in place to give a sheet or film of the thermosetting polyurethane. The sheet or film of thermosetting polyurethane could then be used as described above, that is, if the sheet or film is of the required thickness, it could be sandwiched between the polycarbonate and the polyvinyl acetal and laminated in place. Also, thicker sheets of the thermosetting polyurethane could be skived to the desired thickness or the thicker sheets could be cut into sections and dissolved in a suitable solvent to be applied to the polycarbonate-polyvinyl acetal surface from solution.

The epoxy resins which are used for the thin films are the high molecular weight self-condensed epoxies and the polyepoxides. The self-condensed epoxies are preferred and have the following structural formula:

The following is a generalized formula of a polyepoxide:

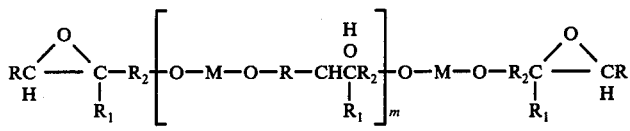

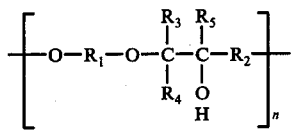

wherein,
n is an integer sufficient to provide the epoxy resin with a molecular weight of at least about 15,000, preferably higher, between 20,000 and 250,000,
$R_1$ is a divalent aromatic radical selected from the group of bisphenol A, substituted bisphenol A, bisphenol F and substituted bisphenol F,
$R_2$ is a $C_1$ to $C_5$ alkyl, and
$R_3$, $R_4$ and $R_5$ are individually selected from the group of hydrogen and a $C_1$ to $C_5$ alkyl.

$R_1$, as shown above, can be a bisphenol A or a bisphenol F, both of which can be substituted. Suitable substituents include $C_1$ to $C_5$ alkyls, halogens such as chlorine, bromine, and fluorine, and $C_1$ to $C_5$ alkoxy groups.

The preferred self-condensed epoxy resin is epichlorohydrin-bisphenol A condensation product, which has the structural formula:

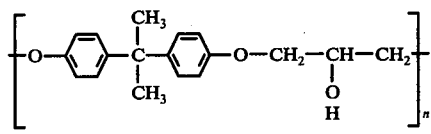

where n is the same as above. Self-condensed epichlorohydrin-bisphenol A epoxy resins are preferred because they readily form optically clear films. When subjected to typical laminating conditions, these epoxy resins form a strong adhesive linkage between the polycarbonate and the polyvinyl acetal. Epichlorohydrin-bisphenol A polymers suitable for use with this invention are available under the trademark EPONOL.

Besides the self-condensed epoxies, polyepoxides which are much lower in molecular weight can also be used. The polyepoxides contain oxarine rings or epoxy groups of the formula:

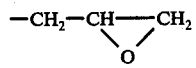

and in the instance of the resins from the reaction of 2,2-bis(4-hydroxyphenyl) propane (bisphenol A) are of epoxy equivalent weight in a range of about 100 to 500.

R being a group selected from a class consisting of hydrogen and aliphatic hydrocarbon groups containing from 1 to about 7 carbon atoms, $R_1$ being a group selected from the class consisting of hydrogen and methyl, and $R_2$ being an aliphatic hydrocarbon group containing from 1 to about 2 carbon atoms, m is a number from 0 to about 10, and M is the organic moiety from one of the polyols such as have already been referred to.

The formula of an average molecule of the starting epoxy polyether resin for 2,2-bis(4-hydroxyphenyl)propane is conventionally represented as follows:

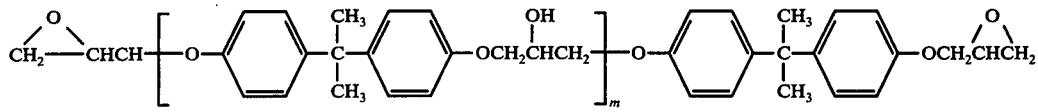

In the formula, m is a number in the series 0, 1, 2, 3 ... and is in the range of about 0 to about 10.

The preparation of polyepoxides is shown in such U.S. Pat. Nos. 2,467,171, 2,615,007, 2,716,123, 3,030,336, 3,053,855 and 3,075,999.

The polycarbonates which are useful in the practice of the invention are the rigid sheet materials which are well known in the art and are available under the trademarks LEXAN and NUCLON. Such polymers are prepared by reacting di-(monohydroxyaryl)-alkanes with derivatives of carbonic acid such as phosgene. Such polymers are of high molecular weight and are described in "Polycarbonates" by W. P. Christopher and D. W. Fox, Chapter 2, pages 13 to 20. Also, rigid polycarbonates are described in U.S. Pat. No. 3,028,365 to Schnell et al.

The polyvinyl acetals which are employed in the present invention may be made from various unsubstituted aldehydes or mixtures thereof or even from unsubstituted ketones containing an active carbonyl group or from mixtures of unsubstituted aldehydes and ketones. Thus, formaldehyde, acetaldehyde, propionaldehyde, butyraldehyde, valeraldehyde, hexaldehyde, benzaldehyde, crotonaldehyde, cyclohexanone and the like and mixtures thereof may be utilized. In general, the polyvinyl acetal is made by reacting an aldehyde with hydrolyzed polyvinyl ester in the presence of a solvent for the product and precipitating the resin product with water. Alternate methods might include carrying out the reaction in the presence of a non-solvent dispersing medium such as water or a non-solvent mixture of water and solvent, e.g. a water ethanol mixture. More detailed methods for preparing such resins are set forth in Morrison et al., U.S. Pat. Re. No. 20,430, dated June 29, 1937, and Lavin et al., U.S. Pat. No. 2,496,480. In general, polyvinyl acetal resins made from saturated lower unsubstituted aliphatic aldehydes are the most suitable. These would include polyvinyl acetal resins made from unsubstituted saturated aliphatic aldehydes containing less than 6 carbon atoms and especially those made from formaldehyde, acetaldehyde, butyraldehyde, and mixtures thereof. Particularly preferred are polyvinyl acetal resins made from butyraldehyde. The preferred molecular weight range is 150,000 to 250,000.

The polyvinyl acetal resins should be plasticized in order to achieve good adhesion to glass and impact properties. The most common plasticizers used are water-insoluble esters of a polybasic acid or a polyhydric alcohol. Examples of suitable plasticizers include triethylene glycol di(2-ethyl-butyrate), dibutyl sebacate, di(-beta-butoxy-ethyl) adipate, and dioctyl phthalate.

Polyvinyl acetal plasticized with the conventional plasticizers described above hazes polycarbonate when directly laminated to it. However, when the polyurethane film is interposed between the conventionally plasticized polyvinyl acetal and the polycarbonate in accordance with this invention, no hazing of the polycarbonate is evidenced.

Polyvinyl acetal plasticized with phosphate such as described in U.S. Pat. No. 3,388,033 to Buckley et al., column 2, line 49, to column 3, line 8, can also be used in the practice of the invention.

Plasticized polyvinyl acetal is well known in the art, being available under the trademarks SAFLEX and BUTACITE.

EXAMPLES

EXAMPLES I TO VIII

Eight 12 inch by 12 inch by ¼ inch polycarbonate sheets which are available under the trademark LEXAN were dried at 180° F. for 24 hours. The polycarbonate sheets were then separately sprayed or brushed with solutions of various polyurethane and epoxy resins dissolved in various solvents. Brushing was done with a paint brush and gave a film thickness estimated to be about 1 to 3 mils as determined by a micrometer. Spraying was done with a hand spray gun, Type MBC, #584 hand, MBC-444 Pin, manufactured by Devilbiss Company of Toledo, Ohio. Spraying pressure was 60 psig and the film thickness was estimated to be 0.01 to 0.03 mils by a Zeiss Interference Microscope. The solutions were permitted to dry on the polycarbonate at room temperature for about 2 to 4 hours, with longer times being used for thicker films. After the film had dried, a 12 inch by 12 inch by 60 mil sheet of polyvinyl butyral (BUTACITE) plasticized with 17.4 percent by weight (based on weight of polyvinyl butyral) of triethylene glycol di-(2-ethyl butyrate) was placed against the polyurethane layer and squared on four sides with the polycarbonate sheet.

The polycarbonate-polyurethane or epoxy-polyvinyl butyral configuration was then sandwiched between two 12 inch by 12 inch by ¼ inch glass laminating pressing plates. A 1 mil thick film of TEDLAR (fluorinated polyvinyl benzene) release film was positioned between the glass and the plastic plies to enable separation of the plastic laminate from the glass at the completion of lamination. The glass-plastic lay up was then inserted in a MYLAR (polyethylene terephthalate) bag and the bag put in an oil autoclave for laminating which was conducted at a temperature of 275° F. and 200 pounds per square inch for 45 minutes. After lamination, test specimens 10 inches in length and 2 inches in width were cut from the laminate and prepared for Peel Testing according to A.S.T.M. D-1876-61T. The results of the Peel Test are shown in Table I below.

Table I

| 90° Peel Test for Polycarbonate Laminated to Polyvinyl Butyral Through a Polyuretane or Epoxy Film | | | | | |
|---|---|---|---|---|---|
| Polyurethane or Epoxy Film | Solvent | Polyurethane or Epoxy % Solvent | Method of Application | Coating thickness in mils | 90° Peel Adhesion in pounds per lineal inch |
| Polycondensate of 4,4'-methylene-bis-(cyclohexyl isocyanate)-hydroxy-terminated polybutylene adipate-1,4-butanediol [1] | Chloroform | 5 | Brushing | 3 | 20 |
| " | Chloroform | 0.5 | Spraying | 0.02 | 23 |
| " | N-methyl-pyrrolidone | 5 | Brushing | 3 | 55 |
| Self-condensed epoxy-reaction product of epichlorohydrin with bisphenol A, known under the trademark EPONOL Resin 55 | 4.6% methyl-ethyl ketone 2.5% cellusolve acetate 0.5% toluene 92.4% tetrahydrofuran | 3 | Spraying | 0.02 | 89 |
| " | " | 3 | Brushing | 3 | 136 |
| Chloroform alone → | | 0 | Brushing | 0 | 0 |
| N-methyl-pyrrolidone alone → | | 0 | Brushing | 0 | 0 |
| Tetrahydrofuran alone → | | 0 | Brushing | 0 | 0 |

EXAMPLES IX TO XI

Laminates were prepared as generally described above but with the exception that a preformed polyurethane sheet was employed as the adhesive layer instead of a film being deposited of a polyurethane or an epoxy solution. The polyurethane sheet was interposed between the polycarbonate and the polyvinyl butyral and the sandwich structure laminated and tested for 90° peel strength as described above. The results are shown in Table II below.

Table II

| 90° Peel Strength for Polycarbonate Laminated to Polyvinyl Butyral Through a Polyurethane Sheet | | |
|---|---|---|
| Polyurethane Type | Sheet Thickness in mils | 90° Peel Adhesion in pounds per lineal inch |
| Polycondensate of 4,4'-bis-(cyclohexyl isocyanate)-hydroxy-terminated polybutylene adipate-1,4-butanediol [2] | 30 | 250 |
| Polyurethane sheeting sold under trademark | 6 | 110 |

Table II-continued

| Polyurethane Type | Sheet Thickness in mils | 90° Peel Adhesion in pounds per lineal inch |
|---|---|---|
| TUFTANE Polycondensate of toluene diisocyanate-poly(oxytetramethylene) glycol trimethylolpropane (3) | 30 | 250 |

(1)The polyurethane was prepared as follows: A poly(1,4-butylene adipate) polyester (785.6 parts by weight) having a molecular weight of 1965, a hydroxyl number of 57 and an acid number of 0.5; and a poly(1,4-butylene adipate) polyester (707.4 parts by weight) having a molecular weight of 1014, a hydroxyl number of 111 and an acid number of 0.5 were dried together with agitation in a glass reactor to remove trace amounts of water by heating to 100° C. under 3 millimeters of mercury pressure for about 3 hours. The pressure is released while introducing purified nitrogen and anhydrous 1,4-butanediol (260.6 parts by weight). The 1,4-butanediol was added over a one-minute period to the agitated mixture of polyester at 93° C. and the mixture heated to 95° C. in 15 minutes. To this mixture 1046.8 parts by weight of 4,4'-methylene-bis-(cyclohexyl isocyanate), product sold commercially under the trademark HYLENE W, containing 0.280 parts of dibutyltin dilaurate catalyst was added over a one-minute period. The butanediol and the diisocyanate were at 22° C. and the additions were both made while the reactor was under a nitrogen atmosphere. The resulting mixture was rapidly agitated for about one minute during which time the temperature of the mixture rose from 80° C. to 95° C. The mixture was poured into a dry reactor coated with TEFLON and was closed and pressed in a 130° C. air-circulating containing purged nitrogen oven for about two hours until the reaction of the polyurethane formation was substantially complete. The NCO content of the polymer was 0.07 percent by weight and determined by infrared spectrometry. The resultant semi-solid polymer was allowed to cool to room temperature, and calendered on a 3-roll mill into a 30-mil thickness sheet. The sheet was then cut into one inch square sections and the polyurethane was dissolved in chloroform solvent with high shear mixing in a Waring blender to form a 5 percent by weight solution.
(2)The polyurethane was prepared as generally described above in (1), but was extruded into sheet form, 30 mils in thickness.
(3)The polyurethane can be prepared as follows: 78.93 parts by weight of a prepolymer (A) which is the reaction product of touene diisocyanate and poly(oxytetramethylene) glycol and sold under the trademark ADIPRENE L-167 ius mixed with 21.07 parts by weight of toluene diisocyanate (80% 2,4-isomer and 20%, 2,6-isomer). This reaction product (B) is degassed by vacuum at 150° F. and allowed to cool to 120° F. before mixing with a polyol curing composition (C) which is prepared by mixing 13.78 parts by weight of 1,4-butanediol with 2.28 parts by weight of trimethylolpropane. The mixture was degassded at 150° F. and allowed to cool to 120° F. The reaction product (B) and the polyol curing aGENT (C) were then pumped through separate lines at a temperature of about 120° F. to a commercial mixing head (Admiral Equipment Corporation of Akron, Ohio) where the components were well mixed and then pumped into a TEFLON coated rotating casting drum. The drum was at a temperature of 290° F. and was rotating at 120 revolutions per minute. It takes about 3½ minutes to coat evenly the surface of the drum and the polyurethane is kept in the rotation drum for 24 hours after which time it can be removed from the drum as a sheet.

I claim:
1. A substantially haze-free transparent laminate comprising a sheet of polycarbonate, a sheet of polyvinyl acetal plasticized with a plasticizer that produces haze in said polycarbonate when said plasticized polyvinyl acetal contacts said polycarbonate and a layer of polyurethane or an epoxy resin interposed between the interfacial surfaces of said sheet of polycarbonate and said sheet of polyvinyl acetal so plasticized for protecting said polycarbonate sheet from haze produced by contact with said plasticized sheet and for bonding said sheets together.
2. The laminate of claim 1 in which the polyvinyl acetal is polyvinyl butyral.
3. The laminate of claim 1 in which the polyurethane is a polycondensate of an organic diisocyanate, a diol selected from the class consisting of polyester diols and polyether diols, and a curing agent containing at least two active hydrogens.
4. The laminate of claim 1 in which the epoxy resin is a self-condensed epoxy resin of epichlorohydrin and 2,2-bis(4-hydroxyphenyl) propane.
5. The laminate of claim 1 in which said layer of polyurethane or epoxy resin has a thickness of 0.01 to 50 mils.
6. The laminate of claim 1 in which the bond strength between said polycarbonate sheet and said polyvinyl acetate sheet is at least 20 pounds per lineal inch as measured by NASA Tech Brief 65-10173.
7. The laminate of claim 2 said polyvinyl butyral is plasticized with triethylene glycol di-(2-ethyl butyrate).

* * * * *

UNITED STATES PATENT AND TRADEMARK OFFICE
CERTIFICATE OF CORRECTION

PATENT NO. : 4,121,014

DATED : October 17, 1978

INVENTOR(S) : Paul E. Shaffer

It is certified that error appears in the above-identified patent and that said Letters Patent are hereby corrected as shown below:

Column 12, line 33, claim 7, please insert --wherein-- after "2".

*Signed and Sealed this*

*Thirteenth* Day of *March 1979*

[SEAL]

*Attest:*

RUTH C. MASON
*Attesting Officer*

DONALD W. BANNER
*Commissioner of Patents and Trademarks*